March 27, 1962 J. W. GOUKER 3,026,974
VEHICLE BRAKES
Filed March 14, 1960 3 Sheets-Sheet 1

INVENTOR
John W. Gouker

March 27, 1962     J. W. GOUKER     3,026,974
VEHICLE BRAKES
Filed March 14, 1960     3 Sheets-Sheet 2
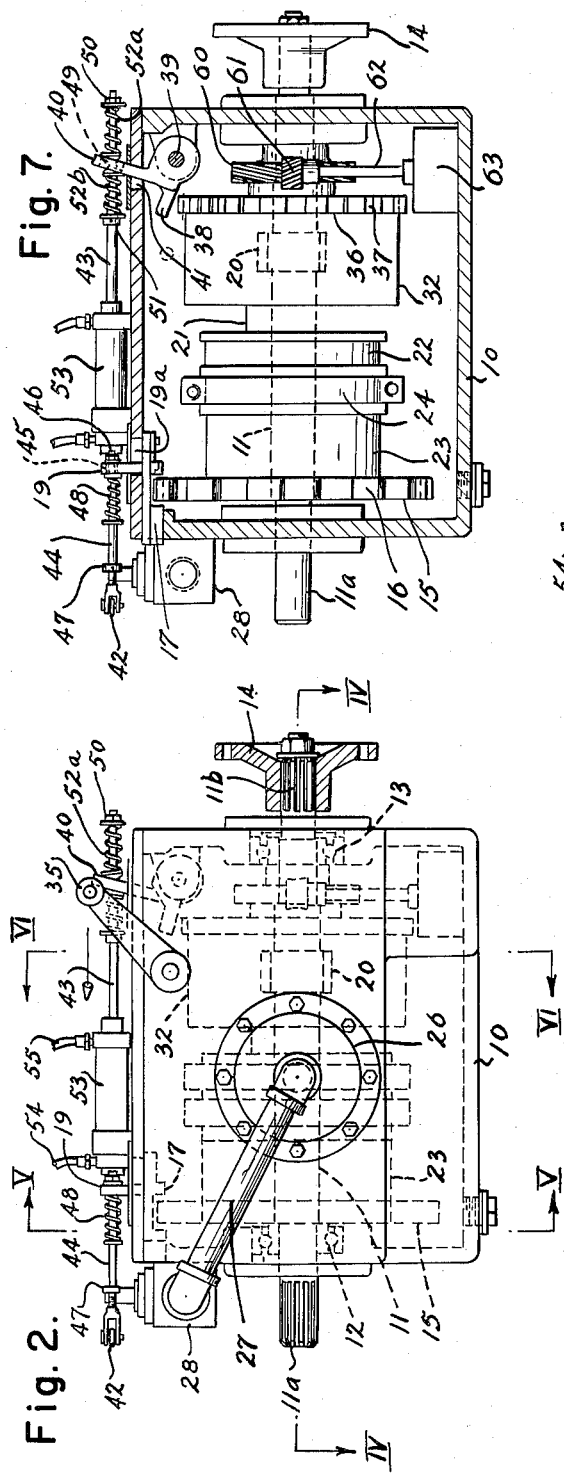
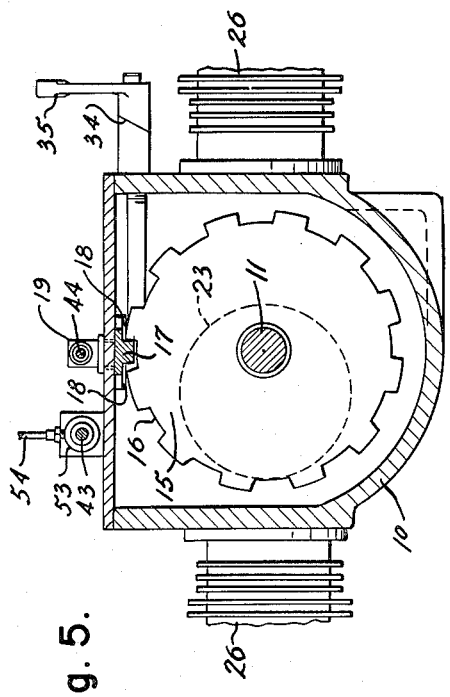
INVENTOR
John W. Gouker
BY
*Hooper, Leonard & Buell*
his attorneys March 27, 1962   J. W. GOUKER   3,026,974
VEHICLE BRAKES Filed March 14, 1960   3 Sheets-Sheet 3

INVENTOR
John W. Gouker
BY Hooper, Leonard & Duell
his attorneys

United States Patent Office 3,026,974
Patented Mar. 27, 1962

3,026,974
VEHICLE BRAKES
John W. Gouker, Uniontown, Pa.
(3rd St., Dunbar, Pa.)
Filed Mar. 14, 1960, Ser. No. 16,623
8 Claims. (Cl. 188—91)

This invention relates to vehicle brakes and particularly to an emergency and holding brake for trucks and like heavy wheeled vehicles.

There has long been a need for a safe, positive emergency brake for trucks and the like which could be positively set as the vehicle stops to prevent any further movement of the vehicle. The danger of brake failure in trucks and the dire consequences of such failures are familiar to everyone. Safety authorities, transit regulating commissions and vehicle manufacturers have sought to provide some solution to this danger. However, no emergency braking system, completely independent of the normal brake system and capable of being set so as to positively prevent failure has been available.

I have invented a vehicle brake which solves all of the above mentioned problems. The brake of my invention is independent of the normal braking system and works on the vehicle drive shaft. It is positive in its action and may be positively set so as to prevent any accident release or slippage.

I preferably provide a housing, a main drive shaft in the housing, a pinion on said shaft intermediate its ends, a locking disc fixed to the shaft and spaced from said pinion, an outer shaft journaled on and coaxial with the main shaft between said locking disc and said pinion, an eccentric on said outer shaft, a cylinder on the housing opening toward the eccentric, piston means on the eccentric movable in said cylinder, a source of fluid open to the cylinder, planetary gear means fixed to the eccentric surrounding and engaging the pinion on the main shaft, an annular gear surrounding the planetary gear means in engagement therewith, first locking means on the annular gear selectively restricting the rotation thereof, valve means between the source of fluid and the cylinder regulating the flow of fluid to and from the cylinder whereby rotation of the eccentric can be regulated and second locking means engaging the locking disc to positively prevent rotation of the main shaft. The annular gear may preferably be in the form of an outer cylindrical shell with internal gear teeth. The first locking means is preferably a brake drum surrounding the annular gear and engageable with its outer periphery or a combination of such a brake drum with a positive latch means.

In the foregoing general description of my invention I have set out certain objects, purposes and advantages of my invention. Other objects, purposes and advantages of my invention will be apparent from a consideration of the following description of a present preferred embodiment of my invention together with the accompanying drawings in which:

FIGURE 2 is a side elevation of a brake of FIGURE 1;

FIGURE 5 is a section on the line V—V of FIGURE 2;

FIGURE 7 is a section on the line VII—VII of FIGURE 3.

Figure 1:
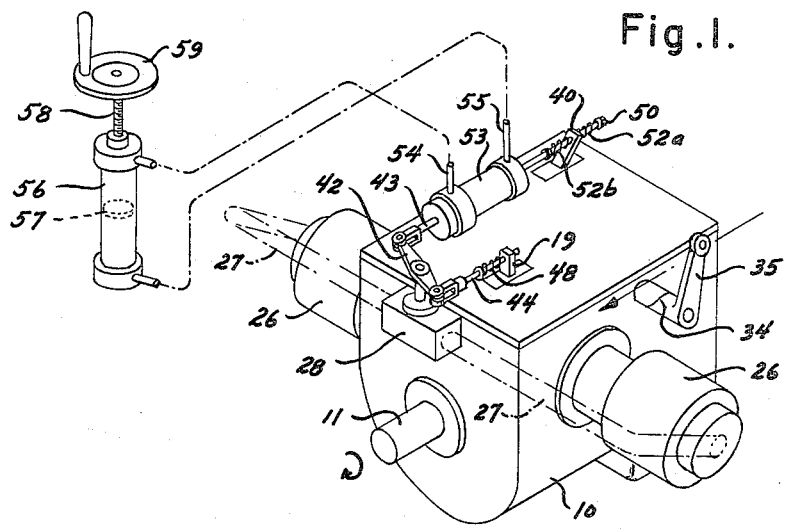
FIGURE 1 is an isometric view of a brake according to my invention.
Figure 3:
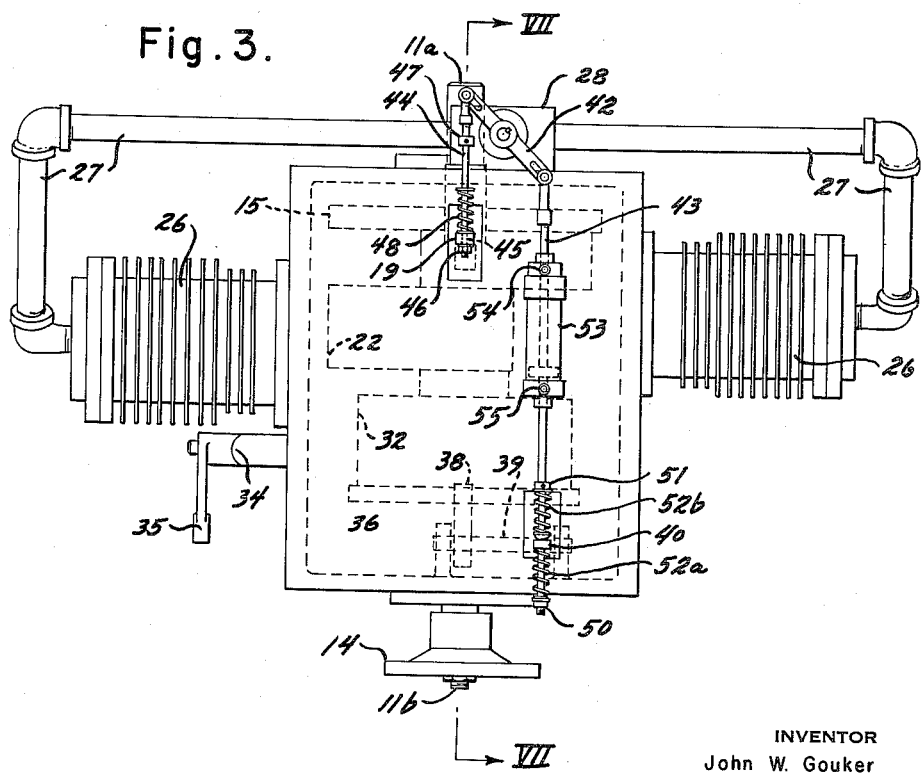
FIGURE 3 is a top plan view of the brake of FIGURE 1.
Figure 4:
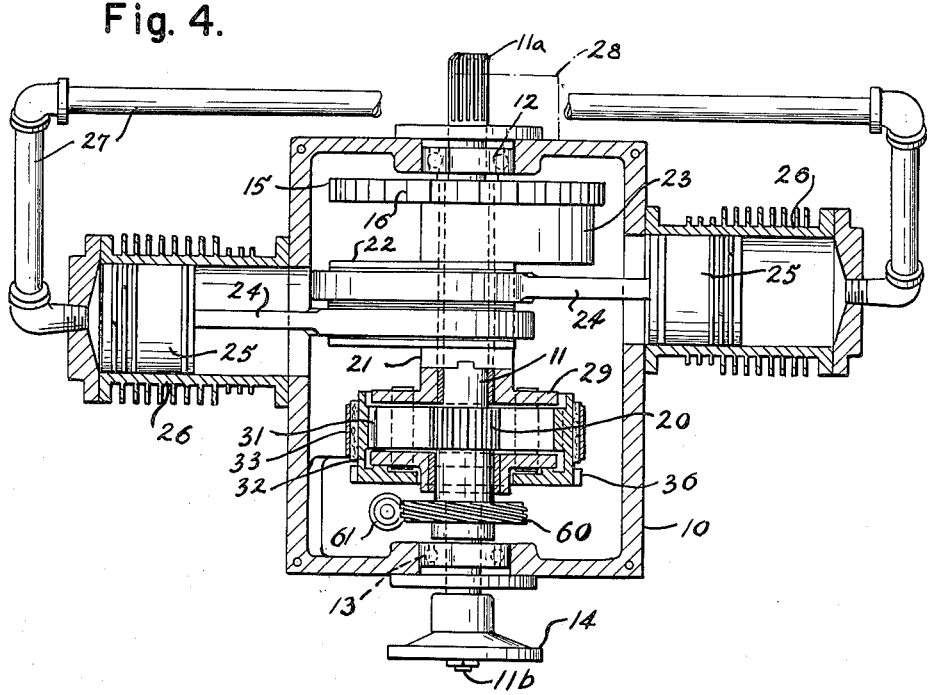
FIGURE 4 is a section on the line IV—IV of FIGURE 2.
Figure 6:
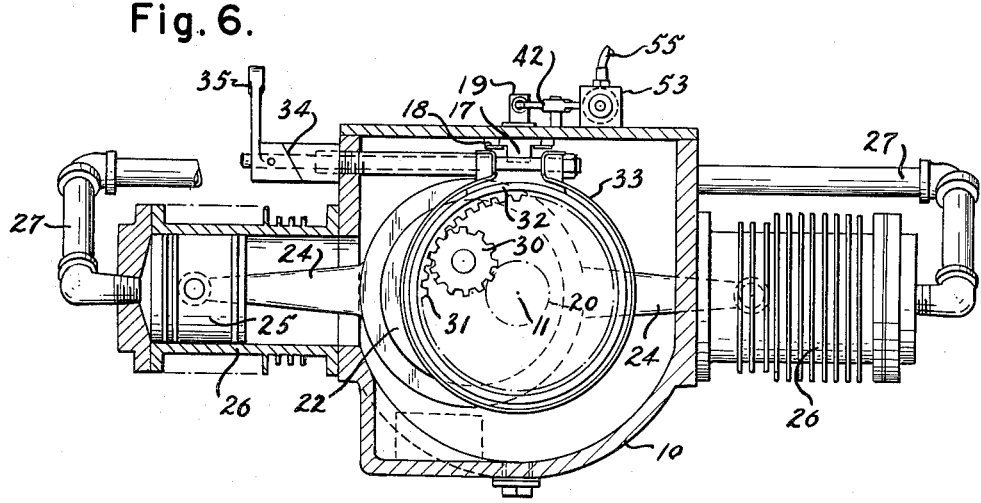
FIGURE 6 is a section on the line VI—VI of FIGURE 2.

Referring to the drawings I have illustrated a housing 10 having a main drive shaft 11 journaled in end bearings 12 and 13 in the ends of housing 10. One end of the drive shaft 11 is provided with a spline 11a for connection with a prime mover (motor) and the opposite end with a spline 11b receiving a coupling 14 for a drive shaft (not shown). A locking disc 15 is provided on the shaft adjacent the bearing 12 and inside the housing. This locking disc is provided with notches 16 adapted to be engaged by a sliding detent 17 slidable in guideways 18 on the top of the housing. The detent 17 is provided with a control arm 19 which extends through a slot 19a in the top of the housing. A pinion 20 is fixed to the shaft 11 intermediate the end walls of the housing 10. Adjacent to the pinion 20 there is provided an outer shaft 21 journaled around and coaxial with the main shaft 11. An eccentric 22 and a counterweight 23 are fixed to this outer shaft. Connecting rods 24 journaled on eccentric 22 drive pistons 25 movable reciprocably in cylinders 26 on opposite sides of the housing 10. A conduit 27 connects the two cylinders 26 through valve 28. The cylinders 26 above pistons 25 and the conduit 27 are filled with hydraulic fluid and valve 28 restricts or controls the fluid flow from one to the other and thereby the relative movement of pistons 25. A spider 29 is fixed to the outer shaft 21 about the pinion 20. Planetary gears 30 are mounted in spider 29 for engagement with pinion 20 which acts as a sun gear. An outer annular gear 31 is formed within a shell 32 surrounding the spider 29 and planetary gears 30. The annular gear 31 engages the planetary gears 30 and is driven thereby. The shell 32 is provided with a brake drum surface surrounded by brake band 33. The brake band 33 is opened and closed by means of a cam member 34 actuated by the operator through any conventional means such as a lever and rod (not shown) connected to the end of cam arm 35.

A second locking disc 36 is fixed to the shell 32 and provided with notches 37 engageable by a pawl 38 mounted on shaft 39 journaled for rotation inside housing 10. The shaft 39 is preferably rotated by a crank arm 40 extending out of the housing 10 through slot 41 in the top thereof.

The valve 28 is provided with an actuating cross arm 42, one end connected to the piston rod 43 of a slave cylinder 53 and the other end of arm 42 to a drive rod 44 extending through an opening 45 in control arm 19. Spaced stops 46 and 47, are provided on rod 44, one on each side of control arm 19. A spring 48 lies between stop 47 and arm 19 to provide bias in the event the locking disc notches 16 and the detent are not in alignment when the vehicle stops. The opposite end of piston rod 43 extends through an opening 49 in crank arm 40 and like rod 44 is provided with spaced stops 50 and 51 on opposite sides of the crank arm and bias springs 52a and 52b on opposite sides of arm 40.

The piston rod 43 is actuated by a piston in slave cylinder 53 mounted on top of housing 10. The slave cylinder 53 is connected at its opposite ends by conduits 54 and 55 with the opposite ends of a master cylinder 56 having a piston 57 controlled by a threaded shaft 58 and hand wheel 59 in the vehicle cab.

A helical gear 60 is provided on the main shaft to engage a helical gear 61 on the end of a drive shaft 62 of a conventional gear oil pump 63. This oil pump 63 delivers oil for lubrication to the bearings and journals of the unit through conventional passages not shown.

The operation of my brake is as follows. Power from the prime mover is delivered to the main shaft 11 through spline 11a and from main shaft 11 to the drive shaft of the vehicle by spline 11b and coupling 14. The pinion 20 rotates the planetary gears 30 which in turn cause rotation of the shell 32 and gear 31. When it is desired to reduce the speed of the vehicle the cam arm 35 is rotated to cause the cam 34 to tighten brake band 33 around the brake surface on shell 32. This stops the rotation of shell 32 and gear 31, causing the planetary gears 30 to rotate spider 29 and thereby the outer shaft 21, the eccentric 22, counterweight 23 and locking disc 15. This drives pistons 25 causing the reversible flow of fluid through conduit 27 and valve 28. The gear ratio between the pinion 20 and the planetary gears is preferably such that the outer shaft 21 rotates at a slower speed than main shaft 11. Preferably this reduction is in the area of three to four times. The hand wheel 59 is then turned causing the piston within slave cylinder 53 to move rod 43 which moves cross arm 42 to close the valve 28 and thereby restricting fluid flow between the cylinders 25 impeding the rotation of the shaft 11. This acts to brake the vehicle. At the same time when rod 43 begins to extend from cylinder 53, the opposite end of rod 43, biased to arm 40, causes the shaft 39 to rotate bringing pawl 38 into engagement with locking disc 36. Any slippage of the brake band 33 on drum 32 will permit the pawl 38 to index within a notch 37, thus preventing further rotation of shell 32 in the event that brake band 33 should fail to hold. When the arm 42 is rotated 60° the valve is closed, and continued rotation causes the spring 48 to either force detent 17 into one of the notches 16 of locking disc 15 or to load the detent so that when a notch 16 comes into alignment the detent 17 immediately enters the notch. This positively locks the main shaft 11 against further rotation. The pawl 38 and detent 17 form a positive mechanical lock so that the main shaft cannot move even though a leak develops in the hydraulic circuitry.

When it is desired to move the vehicle the hand wheel 59 is turned in the opposite direction, this causes the stop 46 to withdraw detent 17 and the spring 52b and stop 51 to load the pawl arm 40. After the first 30° of rotation of arm 42 the detent 17 is completely withdrawn and valve 28 begins to open. This permits movement of pistons 25. The spring bias of spring 52b then causes pawl 38 to withdraw from notches 37 to leave the brake band 33 holding shell 32. When cam 34 is turned to neutral position the band 33 is released and the main shaft 11 is completely released for rotation.

In the foregoing description I have set out a preferred embodiment of my invention, however, it will be understood that this invention may be otherwise embodied within the scope of the following claims.

I claim:
1. An emergency vehicle brake comprising a drive shaft carrying power from a prime mover to the vehicle drive wheels, a pinion spaced intermediate the ends of said shaft, a locking disc fixed to the shaft and spaced from said pinion, an outer shaft journaled about and coaxial with the main shaft between said locking disc and said pinion, an eccentric on said outer shaft, a cylinder spaced from said outer shaft and opening toward the eccentric, piston means in said cylinder drivingly connected to the eccentric for movement in said cylinder, a source of fluid open to said cylinder receiving and delivering fluid under pressure to the cylinder above the piston, planetary gear means fixed to the outer shaft and engaging the pinion, an annular gear surrounding the planetary gear means in engagement therewith, locking means on the annular gear controlled by an operator selectively restricting the rotation thereof, valve means between the source of fluid and the cylinder controlled by the operator and regulating the flow of fluid between said source and the cylinder whereby to control the piston movement and second locking means controlled by the operator positively engaging the locking disc when rotation of the main shaft has stopped.

2. An emergency vehicle brake comprising a drive shaft carrying power from a prime mover to the vehicle drive wheels, a pinion spaced intermediate the ends of said shaft, a locking disc fixed to the shaft and spaced from said pinion, an outer shaft journaled about and coaxial with the main shaft between said locking disc and said pinion, an eccentric on said outer shaft, a cylinder spaced from said outer shaft and opening toward the eccentric, piston means in said cylinder drivingly connected to the eccentric for movement in said cylinder, a source of fluid open to said cylinder receiving and delivering fluid under pressure to the cylinder above the piston, planetary gear means fixed to the outer shaft and engaging the pinion, an annular gear surrounding the planetary gear means in engagement therewith, locking means on the annular gear controlled by an operator selectively restricting the rotation thereof, valve means between the source of fluid and the cylinder controlled by the operator and regulating the flow of fluid between said source and the cylinder whereby to control the piston movement and second locking means controlled by opening and closing the valve means positively engaging the locking disc after the valve is closed and releasing the disc ahead of the valve opening.

3. An emergency vehicle brake comprising a drive shaft carrying power from a prime mover to the vehicle drive wheels, a pinion spaced intermediate the ends of said shaft, a locking disc fixed to the shaft and spaced from said pinion, an outer shaft journaled about and coaxial with the main shaft between said locking disc and said pinion, an eccentric on said outer shaft, a cylinder spaced from said outer shaft and opening toward the eccentric, piston means in said cylinder drivingly connected to the eccentric for movement in said cylinder, a source of fluid open to said cylinder receiving and delivering fluid under pressure to the cylinder above the piston, planetary gear means fixed to the outer shaft and engaging the pinion, an annular gear surrounding the planetary gear means in engagement therewith, locking means on the annular gear controlled by an operator selectively restricting the rotation thereof, second locking disc means on the annular gear, pawl means controlled by the operator engaging said second locking disc for positively locking the annular gear after said locking means has stopped the rotation thereof, valve means between the source of fluid and the cylinder controlled by the operator and regulating the flow of fluid between said source and the cylinder whereby to control the piston movement and second locking means controlled by the operator positively engaging the locking disc when rotation of the main shaft has stopped.

4. An emergency vehicle brake comprising a drive shaft carrying power from a prime mover to the vehicle drive wheels, a pinion spaced intermediate the ends of said shaft, a locking disc fixed to the shaft and spaced from said pinion, an outer shaft journaled about and coaxial with the main shaft between said locking disc and said pinion, an eccentric on said outer shaft, a cylinder spaced from said outer shaft and opening toward the eccentric, piston means in said cylinders drivingly connected to the eccentric for movement in said cylinder, a source of fluid open to said cylinder receiving and delivering fluid under pressure to the cylinder above the piston, planetary gear means fixed to the outer shaft and engaging the pinion, brake means surrounding the planetary gear means contolled by an operator selectively restricting the rotation thereof, valve means between the source of fluid and the cylinder controlled by the operator and regulating the flow of fluid between said source and the cylinder whereby to control the piston movement and locking means controlled by the operator positively engaging the locking disc when rotation of the main shaft has stopped and the valve is closed.

5. An emergency vehicle brake comprising a drive shaft carrying power from a prime mover to the vehicle drive wheels, a pinion spaced intermediate the ends of said shaft, a locking disc fixed to the shaft and spaced from said pinion, an outer shaft journaled about and coaxial with the main shaft between said locking disc and said pinion, an eccentric on said outer shaft, a pair of opposed cylinders spaced from the shaft and opening toward the eccentric, piston means in each of said cylinders drivingly connected to the eccentric from movement in said cylinders, conduit means between said cylinders, fluid filling the conduit and the area of said cylinders above the pistons, planetary gear means fixed to the outer shaft and engaging the pinion, an annular gear surrounding the planetary gear means in engagement therewith, locking means on the annular gear controlled by an operator selectively restricting the rotation thereof, valve means in the conduit between the cylinders controlled by the operator and regulating the flow of fluid between said cylinders whereby to control the piston movements and second locking means controlled by opening and closing the valve means positively engaging the locking disc after the valve is closed and releasing the disc ahead of the valve opening.

6. An emergency vehicle brake comprising a drive shaft carrying power from a prime mover to the vehicle drive wheels, a pinion spaced intermediate the ends of said shaft, a locking disc fixed to the shaft and spaced from said pinion, an outer shaft journaled about and coaxial with the main shaft between said locking disc and said pinion, an eccentric on said outer shaft, a pair of opposed cylinders spaced from the shaft and opening toward the eccentric, piston means in each of said cylinders drivingly connected to the eccentric from movement in said cylinders, conduit means between said cylinders, fluid filling said conduit and the area of said cylinders above the pistons, planetary gear means fixed to the outer shaft and engaging the pinion, an annular gear surrounding the planetary gear means in engagement therewith, lock means on the annular gear controlled by an operator selectively restricting the rotation thereof, second locking disc means on the annular gear, pawl means controlled by the operator engaging said second locking disc for positively locking the annular gear after said locking means has stopped the rotation thereof, valve means in the conduit between the cylinders controlled by the operator and regulating the flow of fluid between said cylinders whereby to control the piston movements and second locking means controlled by the operator positively engaging the locking disc when rotation of the main shaft has stopped.

7. An emergency vehicle brake comprising a drive shaft carrying power from a prime mover to the vehicle drive wheels, a pinion spaced intermediate the ends of said shaft, an outer shaft journaled about and coaxial with the main shaft adjacent said pinion, an eccentric on said outer shaft, a cylinder spaced from said outer shaft and opening toward the eccentric, piston means in said cylinder drivingly connected to the eccentric from movement in said cylinder, a source of fluid open to said cylinder receiving and delivering fluid under pressure to the cylinder above the piston, planetary gear means fixed to the outer shaft and engaging the pinion, an annular gear surrounding the planetary gear means in engagement therewith, locking means on the annular gear controlled by an operator selectively restricting the rotation thereof, valve means between the source of fluid and the cylinder controlled by the operator and regulating the flow of fluid between said source and the cylinder whereby to control the piston movement and thereby control the rotation of the main shaft.

8. An emergency vehicle brake comprising a drive shaft carrying power from a prime mover to the vehicle drive wheels, a pinion spaced intermediate the ends of said shaft, an outer shaft journaled about and coaxial with the main shaft adjacent said pinion, an eccentric on said outer shaft, a pair of cylinders spaced from said outer shaft and opening toward the eccentric, piston means in each of said cylinders drivingly connected to the eccentric from movement in said cylinders, conduit means between said cylinders, fluid filling the conduit and the area of said cylinders above the pistons, planetary gear means fixed to the outer shaft and engaging the pinion, an annular gear surrounding the planetary gear means in engagement therewith, locking means on the annular gear controlled by an operator selectively restricting the rotation thereof, valve means in the conduit between the cylinders controlled by the operator and regulating the flow of fluid between said cylinders whereby to control the piston movement and thereby control the rotation of the main shaft when the locking means is in engagement with the annular gear.

References Cited in the file of this patent
UNITED STATES PATENTS

| | | |
|---|---|---|
| 2,232,252 | Mathey | Feb. 18, 1941 |
| 2,891,423 | Connel et al. | June 23, 1959 |